United States Patent [19]

Tang et al.

[11] Patent Number: 5,750,070
[45] Date of Patent: May 12, 1998

[54] USE OF BIODEGRADABLE POLYMERS IN PREVENTING CORROSION AND SCALE BUILD-UP

[75] Inventors: Jiansheng Tang, Naperville, Ill.; Raymond T. Cunningham, Mechanicsville, Va.; Bo Yang, Naperville, Ill.

[73] Assignee: Nalco Chemical Company, Naperville, Ill.

[21] Appl. No.: 686,616

[22] Filed: Jul. 19, 1996

[51] Int. Cl.$^6$ ............... C23F 11/04; C23F 11/16; C02F 5/00; C09K 3/00

[52] U.S. Cl. ............... 422/16; 422/7; 422/15; 422/17; 252/180; 252/181; 252/389.1; 252/389.22; 252/389.32; 252/389.61; 252/390; 252/393; 252/394; 210/696; 210/698

[58] Field of Search ............... 252/180, 181, 252/389.1, 389.22, 389.32, 390, 393, 394, 389.61; 422/15, 7, 16, 17; 210/696, 698

[56] References Cited

U.S. PATENT DOCUMENTS

| | | | |
|---|---|---|---|
| 2,402,604 | 6/1946 | Coffman | 260/78 |
| 3,859,337 | 1/1975 | Herz et al. | 260/500.5 H |
| 4,532,046 | 7/1985 | Meunier et al. | 210/698 |
| 4,534,881 | 8/1985 | Sikes et al. | 252/180 |
| 4,536,296 | 8/1985 | Vio | 252/8.5 C |
| 4,902,751 | 2/1990 | Lewellyn et al. | 525/340 |
| 4,971,724 | 11/1990 | Kalota et al. | 252/390 |
| 5,128,420 | 7/1992 | Domb et al. | 525/377 |
| 5,308,498 | 5/1994 | Fong et al. | 210/697 |
| 5,531,934 | 7/1996 | Freeman et al. | 252/390 |
| 5,886,872 | 12/1989 | Fong et al. | 525/329.4 |

FOREIGN PATENT DOCUMENTS 0 526 786  10/1993  European Pat. Off. .

*Primary Examiner*—Richard D. Lovering
*Assistant Examiner*—Deanna Baxam
*Attorney, Agent, or Firm*—Robert M. Barrett; Thomas M. Breininger

[57] ABSTRACT

A biodegradable corrosion inhibitor, scale inhibitor and dispersant is provided. The inhibitor comprises one or more polymers from a family of poly(amino acid) polymers that include hydroxamic acid-containing sidechains. Methods of reducing corrosion and scale build-up and a method of dispersing solid particulates in a solution or slurry are provided by adding a polymer of the present invention to a solution or slurry.

4 Claims, No Drawings

USE OF BIODEGRADABLE POLYMERS IN PREVENTING CORROSION AND SCALE BUILD-UP

BACKGROUND OF THE INVENTION

The present invention relates generally to the protection of metallic surfaces from corrosion, scaling and the accumulation of other deposits. More specifically, the present invention relates to corrosion and scale inhibiting compositions, dispersants and methods of using the same.

Corrosion occurs when metals are oxidized to their respective ions and/or insoluble salts. For example, corrosion of metallic iron can involve conversion to soluble iron in a +2 or a +3 oxidation state or insoluble iron oxides and hydroxides. Also corrosion has a dual nature in that (1) a portion of the metal surface is removed and (2) the formation of insoluble salts contributes to the build up of scales and deposits.

First, the loss of metal on the surface will eventually cause deterioration of the structural integrity of the system or structure. Eventually, leakage between the water system and process streams can occur. Therefore, the inhibition of corrosion of iron and steel alloys which come in contact with industrial water is critical. Corrosion difficulties result in immense maintenance costs, as well as costs incurred as a result of equipment failure or costs incurred as a result of alloyed materials if contact with corrosive elements present in industrial waters is not inhibited or prohibited.

Second, the build up of deposits interferes with heat transfer. Specifically, to efficiently transfer heat from a metal surface such as the inside surface of heat exchanger tube, to any liquid medium such as water, or vice versa, the surface of the metal should be clean and free of scales and deposits as possible. Scaled metal surfaces will reduce the rate of heat transfer between the metal surface and the water or other fluid medium and therefore, scaling reduces the efficiency of the system. Further, scaling and deposits can lead to corrosion underneath the deposits on the metallic surface and reduce the useful life of the equipment. Such scales and deposits include calcium carbonate, hydroxyaptite, calcium hydroxide, magnesium hydroxide, iron oxide or iron hydroxide and clay particulates, etc.

The most common way to combat corrosion, scaling and deposit accumulation in aqueous systems is to add corrosion and scale-inhibiting additives and dispersants to the feedwater or solution. Water has been treated with inorganic components, such as chromate or zinc salts, to inhibit corrosion. However, chromate and zinc salts have been found to be injurious to environment and therefore these treatments have fallen out of favor. Water has also been treated with inorganic phosphates or organic phosphonates to inhibit corrosion and/or scaling. However, the use of phosphates and phosphonates also leads to environmental concerns. Currently, organic polymers have been primarily used as scale-inhibitors and dispersants. However, organic polymers are normally non-biodegradable, and thus accumulate in the environment upon release from the water treatment systems, which limit the applicability of such polymers.

Some small molecules, such as gluconic acid, sucharic acid, citric acid, tartaric acid and lactobionic acid might be biodegradable, but their corrosion inhibition activities are low and therefore they are often formulated together with other inorganic corrosion inhibitors such as phosphate or zinc in order to provide effective corrosion inhibition. Underivatized polyaspartic acid is also known to be biodegradable and to have some scale inhibition activity but little or no corrosion inhibition activity. In fact, underivatized polyaspartic acid accelerates corrosion in common industrial water conditions.

Thus, there is a need for biodegradable compositions that are capable of inhibiting both corrosion and scale build up on metallic surfaces.

SUMMARY OF THE INVENTION

The present invention provides a family of compositions that reduce or inhibit development and build-up of corrosion, scales and deposits on metallic surfaces and a method of reducing development and build-up of corrosion, scales and deposits on metallic surfaces. The family of compositions provided by the present invention includes polymers comprising hydroxamic acid-containing poly (amino acids).

The corrosion and scale inhibiting compositions of the present invention comprise poly(amino acid) polymers including hydroxamic acid-containing sidechains. More specifically, the compositions of the present invention comprise polymers of the general formula (I) as shown below:

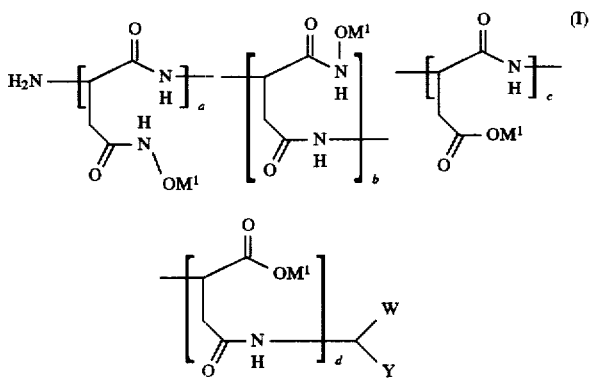

wherein W may be $CO_2M$ or $CONHOH$, wherein M is a metal ion; Y may be $CH_2CONHOH$ or $CH_2CO_2M$ wherein M is a metal ion; $M^1$ may be an alkaline metal, alkaline earth metal or ammonium; $(a+b)/(a+b+c+d)\times 100\% + (c+d)/(a+b+c+d)\times 100\% = 100\%$; $(a+b)/(a+b+c+d)\times 100\%$ ranges from about 0.1% to about 100%, preferred 5%–70%, more preferred 10%–50%; $c+d/(a+b+c+d)\times 100\%$ ranges from 0% to 99.9%; $a/(a+b)\times 100\%$ ranges from 0% to 100%; $b/(a+b)\times 100\%$ ranges from 0% to 100%; $a/(a+b)\times 100\% + b/(a+b)\times 100\% = 100\%$; $c/(c+d)\times 100\%$ ranges from 0% to 100%; $d/(c+d)\times 100\%$ ranges from 0% to 100%; $c/(c+d)\times 100\% + d/(c+d)\times 100\% = 100\%$; and the molecular weight ranges from about 300 to about 200,000.

Other hydroxamic acid-containing poly(amino acids) of the general formula (II) as shown below are within the scope of the present invention:

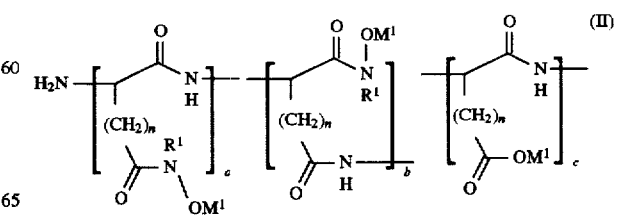

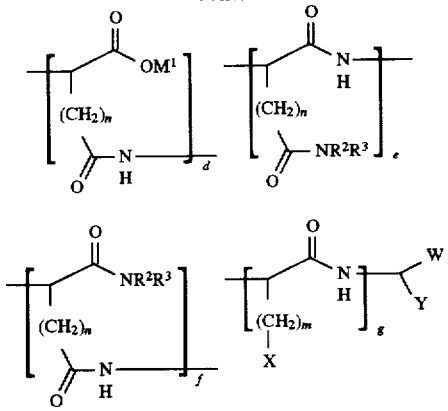

wherein n is 1 or 2; m ranges from 0 to 4; $M^1$ is selected from the group consisting of an alkaline metal, an alkaline earth metal and aluminum; X is selected from the group consisting of H, $CH_3$, $CH(CH_3)_2$, $CH(CH_3)CH_2CH_3$, OH, $p\text{-HOCH}_4$, SH, $CH_2SCH_3$, $CH_2OH$, $CH(OH)CH_3$, $NH_2$, $HNC(:NH)NH_2$, $C(O)NH_2$,

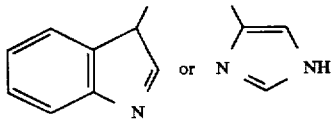

$OPO_3M_2$, $OSO_3M$, $p\text{-}M_2O_3POC_6H_4$, $p\text{-}MO_3SOC_6H_4$, $SPO_2M_2$, $CH_2OPO_3M_2$, $CH_2OSO_3M$, $CH(OPO_3M_2)CH_3$, and $CH(OSO_3M)CH_3$, wherein M is a metal ion, and, wherein W is $CO_2M$ or $C(O)NR^1OH$; Y is $(CH_2)_oC(O)NR^1OH$, $(CH_2)_oCO_2M$, $(CH_2)_oC(O)NR^2R^3$ or $(CH_2)_mX$ wherein M is a metal ion, X and m are defined above, o ranges from 1 to 2; $R^1$, $R^2$ and $R^3$ may be H, alkyl, alkenyl, aryl, carboxyl, sulfonyl, OH or halide substituted alkyl, alkenyl and aryl groups; $R^1$ may also be $OR^1$ wherein $R^1$ is an alkyl or an aryl; (a+b)/(a+b+c+d)×100% ranges from about 0.1% to about 100%, preferred 5% to 70%, more preferred 10% to 50%; (c+d)/(a+b+c+d)×100% ranges from 0% to 99.9%, preferred 30% to 95%, more preferred 50% to 90%; (a+b)/(a+b+c+d)×100%+(c+d)/(a+b+c+d)×100%= 100%; (e+f)/(a+b+c+d+e+f+g)×100% ranges from about 0% to about 50%, preferred 0% to 40%, more preferred 0% to 30%; g/(a+b+c+d+e+f+g)×100% ranges from 0% to about 50%, preferred 0% to 40%, more preferred 0% to 30%; (a+b+c+d)/(a+b+c+d+e+f+g)×100% ranges from about 50% to about 100%, preferred 60% to 100%, more preferred 70% to 100%; (a+b+c+d)/(a+b+c+d+e+f+g)×100%+(e+f)/(a+b+c+d+e+f+g)×100%+g/(a+b+c+d+e+f+g)×100%=100%; a/(a+b)×100% ranges from 0% to 100%; b/(a+b)×100% ranges from 0% to 100%; a/(a+b)×100%+b/(a+b)×100%= 100%; c/(c+d)×100% ranges from 0% to 100%; d/(c+d)× 100% ranges from 0% to 100%; c/(c+d)×100%+d/(c+d)× 100%=100%; e/(e+f)×100% ranges from 0% to 100%; f/(e+f)×100% ranges from 0% to 100%; e/(e+f)×100%+f/(e+f)× 100%=100%; and the molecular weight ranges from about 300 to about 200,000.

The D, L and DL-optical isomers of general formulas (I) and (II) can be utilized as well. The dosage amounts may range from 0.1 to 1000 ppm, more preferably from 1 to 500 ppm, still more preferably from 5 to 50 ppm. The molecular weight of the composition of the present invention can range from about 300 to about 200,000, more preferably from 300 to 30,000, still more preferably from 300 to 10,000.

The polymers of the present invention are biodegradable and extremely effective corrosion inhibitors. Further, the polymers of the present invention are effective scale inhibitors of calcium carbonate and magnesium carbonate. The above copolymers are also effective in inhibiting scales and deposits of clays and other scales. These biodegradable copolymers are highly calcium tolerant. The polymers of the present invention are more effective and efficient as corrosion inhibitors, dispersants and scale inhibitors than unmodified polyamino acids such as unmodified polyaspartic acid polymers. Further, the polymers of the present invention are more effective and efficient as corrosion inhibitors, dispersants and scale inhibitors than α-hydroxy carboxylic acids such as gluconic acid, D-saccharic acid, citric acid, tartaric acid, etc.

An advantage of the present invention is to provide a new family of water soluble polymers which are biodegradable and which are effective corrosion inhibitors, scale inhibitors and dispersants.

Another advantage of the present invention is to achieve high-performance corrosion inhibition using hydroxamic acid-containing poly(amino acids).

Yet another advantage of the present invention is to achieve high-performance scale inhibition using hydroxamic acid-containing poly(amino acids).

Still another advantage of the present invention is to provide high-performance dispersants using hydroxamic acid-containing poly(amino acids).

Another advantage of the invention is to provide a family of biodegradable polymers which simultaneously disperse particulate matter and inhibits corrosion in aqueous systems, especially in industrial aqueous systems.

Another advantage of the invention is to provide a family of biodegradable polymers which simultaneously disperse particulate matter and inhibits many types of scales in aqueous systems, especially in industrial aqueous systems.

Another advantage of the invention is to provide a family of biodegradable polymers which simultaneously inhibits corrosion and scale build-up in aqueous systems, especially in industrial aqueous systems.

Another advantage of the present invention is to provide a method of achieving high-performance corrosion inhibition or slurry using hydroxamic acid-containing poly(amino acids).

Yet another advantage of the present invention is to provide a method of achieving high-performance scale inhibition using hydroxamic acid-containing poly(amino acids).

Still another advantage of the present invention is to provide a method of dispersing particulate matter in a solution using hydroxamic acid-containing poly(amino acids).

Another advantage of the invention is to provide a family of biodegradable polymers which simultaneously disperse particulate matter and inhibits corrosion in aqueous systems, especially in industrial aqueous systems.

Another advantage of the invention is to provide a family of biodegradable polymers which simultaneously disperse particulate matter and inhibits many types of scales in aqueous systems, especially in industrial aqueous systems.

Another advantage of the invention is to provide a family of biodegradable polymers which simultaneously inhibits corrosion and scale build-up in aqueous systems, especially in industrial aqueous systems.

Yet another advantage of the present invention is to provide a method and a family or biodegradable polymers which effectively dispose solid particulates in a solution or slurry.

Still another advantage of the present invention is to provide an improved corrosion, scale and deposit inhibiting composition that is environmentally acceptable.

Yet another advantage of the present invention is to provide a new use for hydroxamic acid-containing poly (amino acids).

A further advantage of the present invention is to provide improved scale-inhibiting compositions which have aqueous and non-aqueous applications.

Additional features and advantages are described in, and will be apparent from, the detailed description of the presently preferred embodiments.

DETAILED DESCRIPTION OF THE PRESENTLY PREFERRED EMBODIMENTS

The present invention provides an improved scale and deposit inhibiting composition that is environmentally acceptable. In a preferred embodiment, the corrosion and scale inhibiting composition is one or more amino acid polymers containing hydroxamic acid, or poly(amino acid) polymers including hydroxamic acid-containing sidechains. The family of polymers provided by the present invention can be represented by two formulas (I) and (II) as shown below wherein formula (I) is as follows:

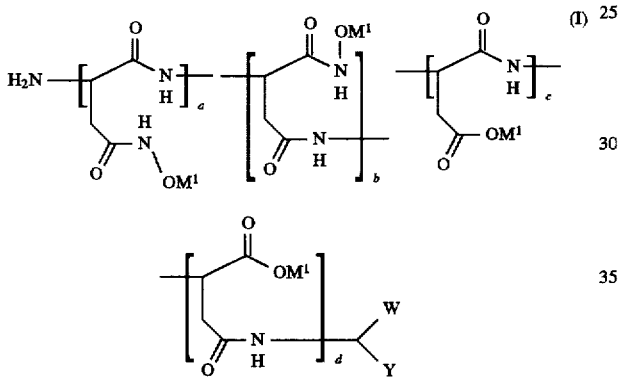

wherein W may be $CO_2M$ or $CONHOH$, wherein M is a metal ion; Y may be $CH_2CONHOH$ or $CH_2CO_2M$ wherein M is a metal ion; $M^1$ may be an alkaline metal, alkaline earth metal or ammonium; $(a+b)/(a+b+c+d)\times 100\%+(c+d)/(a+b+c+d)\times 100\%=100\%$; $(a+b)/(a+b+c+d)\times 100\%$ ranges from about 0.1% to about 100%, preferred 5%–70%, more preferred 10%–50%; $c+d/(a+b+c+d)\times 100\%$ ranges from 0% to 99.9%; $a/(a+b)\times 100\%$ ranges from 0% to 100%; $b/(a+b)\times 100\%$ ranges from 0% to 100%; $a/(a+b)\times 100\%+b/(a+b)\times 100\%=100\%$; $c/(c+d)\times 100\%$ ranges from 0% to 100%; $d/(c+d)\times 100\%$ ranges from 0% to 100%; $c/(c+d)\times 100\%+d/(c+d)\times 100\%=100\%$; and the molecular weight ranges from about 300 to about 200,000.

Other hydroxamic acid-containing poly(amino acids) of the general formula (II) as shown below are within the scope of the present invention:

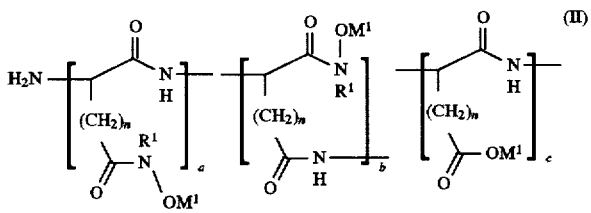

-continued

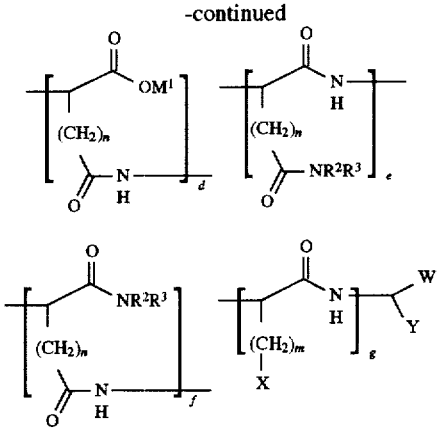

wherein n is 1 or 2; m ranges from 0 to 4; $M^1$ may be an alkaline metal, an alkaline earth metal or aluminum; X is H, $CH_3$, $CH(CH_3)_2$, $CH(CH_3)CH_2CH_3$, OH, $p\text{-}HOC_6H_4$, SH, $CH_2SCH_3$, $CH_2OH$, $CH(OH)CH_3$, $NH_2$, $HNC(:NH)NH_2$, $C(O)NH_2$,

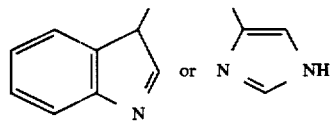

$OPO_3M_2$, $OSO_3M$, $p\text{-}M_2O_3POC_6H_4$, $p\text{-}MO_3SOC_6H_4$, $SPO_2M_2$, $CH_2OPO_3M_2$, $CH_2OSO_3M$, $CH(OPO_3M_2)CH_3$, $CH(OSO_3M)CH_3$, wherein M is a metal ion, and, wherein W is $CO_2M$ or $C(O)NR^1OH$; Y is $(CH_2)_kC(O)NR^1OH$, $(CH_2)_kCO_2M$, $(CH_2)_kC(O)NR^2R^3$ or $(CH_2)_mX$ wherein M is a metal ion, X and m are defined above, k ranges from 1 to 2; $R^1$, $R^2$ and $R^3$ may be H, alkyl, alkenyl, aryl, carboxyl, sulfonyl, OH or halide substituted alkyl, alkenyl and aryl groups; $R^1$ may also be $OR^1$ wherein $R^1$ is an alkyl or an aryl; $(a+b)/(a+b+c+d)\times 100\%$ ranges from about 0.1% to about 100%, preferred 5% to 70%, more preferred 10% to 50%; $(c+d)/(a+b+c+d)\times 100\%$ ranges from 0% to 99.9%, preferred 30% to 95%, more preferred 50% to 90%; $(a+b)/(a+b+c+d)\times 100\%+(c+d)/(a+b+c+d)\times 100\%=100\%$; $(e+f)/(a+b+c+d+e+f+g)\times 100\%$ ranges from about 0% to about 50%, preferred 0% to 40%, more preferred 0% to 30%; $g/(a+b+c+d+e+f+g)\times 100\%$ ranges from 0% to about 50%, preferred 0% to 40%, more preferred 0% to 30%; $(a+b+c+d)/(a+b+c+d+e+f+g)\times 100\%$ ranges from about 50% to about 100%, preferred 60% to 100%, more preferred 70% to 100%; $(a+b+c+d)/(a+b+c+d+e+f+g)\times 100\%+(e+f)/(a+b+c+d+e+f+g)\times 100\%+g/(a+b+c+d+e+f+g)\times 100\%=100\%$; $a/(a+b)\times 100\%$ ranges from 0% to 100%; $b/(a+b)\times 100\%$ ranges from 0% to 100%; $a/(a+b)\times 100\%+b/(a+b)\times 100\%=100\%$; $c/(c+d)\times 100\%$ ranges from 0% to 100%; $d/(c+d)\times 100\%$ ranges from 0% to 100%; $c/(c+d)\times 100\%+d/(c+d)\times 100\%=100\%$; $e/(e+f)\times 100\%$ ranges from 0% to 100%; $f/(e+f)\times 100\%$ ranges from 0% to 100%; $e/(e+f)\times 100\%+f/(e+f)\times 100\%=100\%$; and the molecular weight ranges from about 300 to about 200,000.

The D, L and DL-optical isomers of general formulas (I) and (II) can be utilized as well. The dosage amounts may range from 0.1 to 1000 ppm, more preferably from 1 to 500 ppm, still more preferably from 5 to 50 ppm. The molecular weight of the composition of the present invention can range from 300 to 200,000, more preferably from 300 to 30,000, still more preferably from 300 to 10,000.

By way of example, and not limitation, examples of the present invention will now be given.

EXAMPLES

Corrosion Inhibition Tests

A working electrode was prepared consisting of a pre-polished carbon steel (C1010) cylindrical tube (length of 0.5 inches, outer diameter of 0.5 inches, area equal to 5 cm$^2$) sealed with MICROSTOP STOP-OFF lacquer and installed on a Pine rotator. The electrode was polished with a 600 grit SiC sand paper, washed with acetone and dionized water, and dried with a piece of clean Kimwipes™ before the lacquer was applied. Then the electrode was placed in the air for approximately 15 minutes to allow the lacquer to dry.

The electrode was etched in a solution 0.5M H$_2$SO$_4$ for 30 seconds and washed with dionized water again just before immersion. The electrode surface preparation steps were used to obtain a reproducible surface with minimal amounts of surface oxides and organic contamination. The counter electrode consisted of two high density graphite rods. A saturated calomel electrode was used as the reference electrode. Solution Ohmic drop was minimized by placing the small Luggin capillary opening about 1 to 2 mm from the working electrode surface. A.C. impedance experiments shows that the ohmic drop in the low corrosion rate conditions (e.g., $R_p$>3000 ohm cm$^2$ or <7 to 9 mpy) usually contributed to not greater than 10% of the total measured polarization resistance ($R_p$).

A Greene Cell holding 700 ml solution was used in the tests. The test solutions were prepared from dionized water, analytical grade chemicals and chemicals synthesized according to the method described in this invention. The solution was aerated and allowed to come to thermal and chemical steady-state (typically about 0.5 hours) before immersing the working electrode. All the openings of the cell were covered with either a rubber plug or Saran Wrap™ to minimize solution loss due to evaporation. The loss due to evaporation was usually less than 10% in 24 hours. All the bench-top tests were conducted at 100°±0.5° F.

An EG&G Princeton Applied Research Model 273 potentiostat and a Dell 386SX computer operating under the control of EG&G software packages (M352 and Headstart), were used to conduct the electrochemical measurements. After 20 to 24 hours of immersion, the polarization resistance of the electrode was determined by imposing a small overpotential (+15 mV versus $E_{corr}$) on the working electrode and measuring the resulting current under steady state conditions. Quasi-steady-state potentiodynamic cathodic and anodic scans (e.g., 0.2 mV/sec) were conducted immediately after the polarization resistance measurement. These measurements were commenced at the corrosion potential and polarized up to 200 mV in either cathodic or anodic direction. The cathodic branch was recorded first. The anodic scan was conducted about 0.5 hours after the completion of the cathodic scan. The corrosion rates were determined from extrapolation of either the anodic branch or cathodic branch of the linear log(i) versus potential region of the polarization curve to the corrosion potential or were determined from the polarization resistance with the use of the Stern-Geary equation. The Tafel slopes determined from the quasi-steady-state potentiodynamic scans were used to calculate the corrosion rates from the measured polarization resistances. The corrosion rates shown were calculated as the average of polarization resistance rate, anodic Tafel and cathodic Tafel extrapolation rates. Solution data: 360 ppm CaCl$_2$+200 ppm MgSO$_4$ +200 ppm or 100 ppm NaHCO$_3$ (as CaCO$_3$); 20–24 h immersion; aerated; 100° F.; 200 rpm; C1010 electrode, polished and acid etched.

TABLE 1

| Inhibitor | Copolymer composition N-hydroxyaspartamide/ aspartic acid | Mw | Inh. dosage (ppm) | NaHCO$_3$ (ppm) | PBTC[a] (ppm) | pH$_{end}$ | Mean Corrosion Rate (mpy) | polymer I[b] (ppm) | polymer II[c] (ppm) |
|---|---|---|---|---|---|---|---|---|---|
| Blank | | | 0 | 100 | 0 | 7.50 | 25.7 | 0 | 0 |
| Blank | | | 0 | 200 | 0 | 9.08 | 21.2 | 0 | 10 |
| Blank | | | 0 | 100 | 0 | 9.00 | 41.2 | 0 | 10 |
| Blank | | | 0 | 200 | 0 | 8.40 | 23.3 | 0 | 20 |
| Blank | | | 0 | 200 | 0 | 8.70 | 29.1 | 0 | 30 |
| Blank | | | 0 | 200 | 0 | 9.03 | 21.1 | 0 | 60 |
| Blank | | | 0 | 100 | 2 | 8.48 | 35.5 | 0 | 0 |
| Blank | | | 0 | 100 | 4 | 8.08 | 46.7 | 0 | 0 |
| Blank | | | 0 | 100 | 10 | 8.35 | 29.6 | 0 | 0 |
| Blank | | | 0 | 100 | 20 | 8.34 | 40.0 | 0 | 0 |
| 3909-139C[d] | 46/54 | 1.9k | 25 | 100 | 0 | 9.00 | 8.85 | 0 | 10 |
| 3909-139C[d] | 46/54 | 1.9k | 50 | 100 | 0 | 9.00 | 1.85 | 0 | 10 |
| 3993-40[d] | 46/54 | 3.5k | 50 | 200 | 0 | 8.88 | 3.75 | 0 | 10 |
| 3993-53A[d] | 54/46 | 6.0k | 50 | 200 | 0 | 8.95 | 2.89 | 0 | 10 |
| 4049-68b[d] | 50/50 | ~11k | 50 | 200 | 0 | 9.00 | 1.82 | 0 | 10 |
| 4049-68C[d] | 42/58 | ~13k | 50 | 200 | 0 | 8.93 | 2.08 | 0 | 10 |
| 3993-53A[d] | 54/46 | 6.0k | 50 | 200 | 5 | 8.65 | 2.51 | 20 | 10 |
| Poly(asp)[e] | | 94k | 50 | 100 | 0 | 9.17 | 31.5 | 0 | 10 |
| Poly(asp)[e] | | 92k | 50 | 100 | 0 | 9.02 | 52.4 | 0 | 10 |
| Poly(asp)[d] | | 3.2k | 50 | 200 | 0 | 9.12 | 46.1 | 0 | 10 |
| Citric acid | | | 40 | 100 | 0 | 8.50 | 14.4 | 0 | 10 |
| Citric acid | | | 100 | 100 | 0 | 8.60 | 3.23 | 0 | 10 |
| Citric acid | | | 200 | 100 | 0 | 8.80 | 7.17 | 0 | 10 |
| Citric acid | | | 40 | 200 | 0 | 8.30 | 33.0 | 0 | 10 |
| Citric acid | | | 100 | 200 | 0 | 8.60 | 6.50 | 0 | 10 |
| Citric acid | | | 100 | 50 | 0 | 7.97 | 6.50 | 0 | 10 |
| Citric acid | | | 100 | 100 | 0 | 8.21 | 22.5 | 0 | 10 |

TABLE 1-continued

| Inhibitor | Copolymer composition N-hydroxyaspartamide/ aspartic acid | Mw | Inh. dosage (ppm) | NaHCO$_3$ (ppm) | PBTC[a] (ppm) | pH$_{end}$ | Mean Corrosion Rate (mpy) | polymer I[b] (ppm) | polymer II[c] (ppm) |
|---|---|---|---|---|---|---|---|---|---|
| Citric acid | | | 100 | 100 | 4 | 8.39 | 13.4 | 0 | 0 |
| Tartaric acid | | | 75 | 100 | 0 | 8.30 | 6.43 | 0 | 0 |
| Tartaric acid | | | 50 | 100 | 2 | 8.17 | 13.3 | 0 | 5 |
| Gluconic acid | | | 100 | 200 | 0 | 8.75 | 6.21 | 0 | 10 |
| Gluconic acid | | | 150 | 100 | 0 | 8.26 | 8.19 | 0 | 10 |
| Gluconic acid | | | 200 | 100 | 0 | 8.86 | 1.51 | 0 | 10 |
| Gluconic acid | | | 150 | 200 | 0 | 8.67 | 0.52 | 0 | 10 |
| Gluconic acid | | | 50 | 100 | 2 | 8.14 | 15.6 | 0 | 5 |
| Gluconic acid | | | 50 | 200 | 2 | 8.20 | 15.5 | 0 | 5 |
| D-sacharic acid | | | 100 | 100 | 5 | 8.77 | 3.40 | 0 | 10 |
| D-sacharic acid | | | 50 | 100 | 5 | 8.38 | 5.65 | 0 | 10 |
| Lactobionic acid | | | 50 | 100 | 5 | 8.75 | 33.5 | 0 | 10 |

[a]2-phosphono-butane-1,2,4-tricarboxylic-acid.
[b]Polymer II: Polyacrylate, Mw: 2000, given as active
[c]Polymer I: 13.3% Acrylic acid(50⁻60%)/Acrylamide(20⁻36%)/N-sulfonomethylacrylamide(14%⁻20%) terpolymer.
[d]Preparation conditions of those polymer samples are listed in Table 4.
[e]Poly(aspartic acid)

This data indicates that hydroxamic acid-containing poly(amino acid) polymers are better mild steel corrosion inhibitor than the well known α-Hydroxy carboxylic acids such as gluconic acid, D-sacharic acid, citric acid, tartaric acid, etc. Further, this data indicates that poly(aspartic acid) is not a corrosion inhibitor. Still further, this data suggests that Polymer II and PBTC alone show little corrosion inhibition; they act primarily as a CaCO$_3$ scale inhibitors.

Pilot Cooling Tower Tests

In a second set of tests, a pilot cooling tower (PCT) apparatus was employed that includes all the essential features of a typical industrial open recirculating cooling tower and related heat-exchanger system. It is designed to simulate the basic processes in an open-recirculating cooling water system. A PCT allows one to evaluate the performance of a cooling water treatment program as a function of water chemistry, flow rate, temperature, heat flux, holding time index and metallurgy, etc. under dynamic conditions (e.g., the parameters may show a certain degree of continuous variation as in a real industrial cooling water system).

The recirculation pump draws cool water from the basin, pumps the water over the heat-transfer tubes which heats the water. The heated water is sprayed into a tower where it is cooled by evaporation and returned to the basin. The heat-transfer tubes are cleaned and weighted prior to and after each test. Clear Pyrex™ glass surrounds each tube during a test in order to allow visual evaluation. Coupons and a Corrater® also provide information related to corrosion. Conductivity, pH, basin temperature, return temperature and Corrater readings are monitored continuously and recorded to a computer.

The PCT test was carried out to conform the following conditions: (1) 100°/110° F. basin/return temperature; (2) 50 liters system solution capacity; (3) 2 gpm flow rate, or 126.2 ml/second recirculation rate; (4) about 25 hours holding time index; (5) concentration ratio: 1 (start), 3.5 (maintenance); and (6) 2.6 feet/second fluid velocity past the heat transfer metal specimen (metal tube o.d.: 0.5 inch, glass tube o.d.: 1 inch, flow channel cross-sectional area: 1.58 cm$^2$, tube length=18.6 inch).

Several heat transfer mild steel (C1010) and stainless steel (SS304) tubes were arranged in a series in the water stream with a heat flux ranging from 5000 to 12400 BTU/ft$^2$-hr. A mild steel coupon and a mild steel Corrater® were also installed in the water stream between the last heat transfer tube and the basin.

The concentration ratio was controlled by intermittently activating a fixed speed peristaltic blowdown pump. Chemical treatment feed was activated at the same time as the blowdown pump using a syringe in the fusion pump. The selection of syringe size and plunger speed was calculated based on the replacement of chemicals removed from the system by the blowdown pump. The activation of blowdown and chemical treatment feed pumps was achieved by a conductivity controller. The fan in the tower was activated/deactivated by a temperature controller. Water lost to evaporation or blowdown was replaced by a makeup line with a level controller.

Chlorine levels were maintained by continuously feeding a solution of household bleach to the tower basin using a constant speed peristaltic pump. By adjusting the concentration of the bleach feed rate based on the analyzed chlorine residual, the desired residual level (from about 0.2 to about 0.4 ppm as OCl$^-$) was obtained.

Water analyses were performed each working day as a means to monitor the system and verify product dosages. At the end of the PCT test (e.g., 14 days), various specimens (metal tubes and coupons) were analyzed according to the weight gain and loss of the test specimens to determine the performance of the chosen program dosages on corrosion and deposit control.

A PCT test was conducted to confirm the bench-top results. In this test, 50 ppm active hydroxamic acid-containing polyaspartic acid (polymer No. 3993-169 as listed in Table 4), 5 ppm PBTC, 3 ppm TT, 10 ppm polymer II active and 2.66 ppm polymer I active was used at maintenance level to provide corrosion and scale control at 3 to 3.4 cycle Lake Michigan water (e.g., 305 ppm CaCl$_2$, 170 ppm MgSO$_4$, 200 ppm NaHCO$_3$, all as CaCO$_3$). The pH was controlled at 8.7 by feeding dilute H$_2$SO$_4$. Bleach was used as the biocide. The test duration was 14 days.

The following results for mild steel and stainless steel, obtained by mass measurement, are presented in Table 2.

TABLE 2

| | Mild Steel | | Stainless Steel | |
| --- | --- | --- | --- | --- |
| | Corrosion Rate | Deposit Rate | Corrosion Rate | Deposit Rate |
| | 2.4 mpy | 42.3 mg/yr-cm$^2$ | 0.0 mpy | 8.30 mg/yr-cm$^2$ |
| Industry acceptable limits: | <3 mpy | <73 mg/yr-cm$^2$ | <0.2 mpy | <11.0 mg/yr-cm$^2$ |

The average corrosion rate from the Corrater™ readings for mild steel was 1.9 mpy, in good agreement with the value obtained from mass loss measurement.

This invention is applicable to industries where mild steel corrosion inhibition and scale inhibition in aqueous systems is desirable, such as industries using cooling towers and the like. Hydroxamic acid-containing poly(amino acid)s in amounts ranging from 0.1 to 1000 ppm may be used alone or in combination with one or more of the following scale inhibitors chosen from the group consisting of polyacrylate, polymethylacrylate, a copolymer of acrylic acid and methacrylic acid, a copolymer of acrylic acid and acrylamide, polymaleic anhydride, a copolymer of acrylic acid and maleic acid copolymer, polyol esters, 1-hydroxyethylidene-1,1-diphosphonic acid, 2-phosphono-butane-1,2,4-tricarboxylic acid (PBTC), amino tri(methylene phosphonic acid), an acrylic acid/acrylamide/amino methane sulfonate terpolymer, polyaspartic acid and mixtures thereof. Such combined compositions may exert a synergistic effect in terms of corrosion inhibition, scale inhibition and dispersancy.

Hydroxamic acid-containing poly(amino acid)s in amounts ranging from 0.1 to 1000 ppm may also be used alone or in combination with one or more yellow metal corrosion inhibitors chosen from the group consisting of benzotriazole, tolyltriazole, mercaptobenzothiazole and other azole compounds. Such combinations may exert a synergistic effect in terms of corrosion inhibition.

Hydroxamic acid-containing poly(amino acid)s in amounts ranging from 0.1 to 1000 ppm may also be used alone or in combination with one or more following chemicals including phosphorous containing inorganic chemicals such as phosphates, pyrophosphates, polyphosphates; hydroxycarboxylic acids or their salts such as gluconic acid, glucaric acid; $Zn^{2+}$, $Ce^{2+}$, $MoO_4^{2-}$, $VO_3^{2-}$, $WO_4^{2-}$. Such combinations may exert a synergistic effect in terms of corrosion inhibition.

Hydroxamic acid-containing poly(amino acid)s in amounts ranging from 0.1 to 1000 ppm may also be used alone or in combination with one or more biocides such as oxidizing biocides, e.g., $Cl_2$, NaOCl, NaOBr, or nonoxidizing biocides, e.g., glutaldehyde, isothiazolinones (i.e., 5-chloro-2-methyl-4-isothiazolin-3-one or 2-methyl-4-isothiazoli-3-one) or Kathon WT, sulfamic acid-stabilized bleach and sulfamic acid-stabilized bromine. Such combinations may exert a synergistic effect in terms of corrosion inhibition, scale inhibition and bacterium control.

In addition, hydroxamic acid-containing poly(amino acid)s in amounts ranging from 0.1 to 1000 ppm may be used alone or in combination with scale inhibitors, yellow metal corrosion inhibitors, biocides and other chemical additives.

Stir & Settle Test Procedures and Results

The formation of calcium carbonate crystals from a saturated solution of calcium and carbonate ions is an endothermic process indicating that process has a greater driving force at higher temperatures and that calcium carbonate deposits are most easily formed at elevated temperatures. In this test, the tendency of an inhibitor to the formation of calcium carbonate precipitate at a temperature of interest is investigated. Such a precipitate has been viewed as forming by the adherence of very small particles to each other or to surfaces. Scale inhibitors seek to limit the agglomeration and adherence of these small particles, and thus reduce the amount of calcium carbonate deposit which is formed on the heat exchanger tubes of a cooling tower system or other industrial water treatment systems such as boiler metal surfaces.

In a stir and settle test, calcium and bicarbonate were added to provide initial concentrations of 500 ppm of each (as $CaCO_3$). The inhibitor concentrations are listed in Table 3. The temperature of the test solution was maintained at 122° F. (50° C). Using dilute aqueous NaOH, the pH was slowly increased to 9.0 and maintained during the two hour test. At the conclusion of each test, each solution was filtered with a 0.45 μm filter and the final soluble calcium concentration was determined by atomic absorption analysis. The percent inhibition values were calculated by dividing the final calcium concentration by the initial calcium concentration. Alternatively, the difference between the initial and final soluble calcium concentrations are used to represent the amount of calcium which would be expected to form $CaCO_3$ on the heat exchanger surfaces.

Using this method, a number of hydroxamic acid-containing polyaspartic acid samples were tested. The results are shown below in Table 3.

Cooling Water Clay Dispersancy Test Procedure and Results

This test examines the efficiency of a given polymer at particulate matter. The assumption is that polymers which promote dispersancy will reduce the settling rate of clay particles. The dispersed clay causes higher turbidity.

A standard suspension of particulate (clay) was prepared in an aqueous solution of 300 ppm soluble calcium as $CaCO_3$. 1 Liter of this solution was placed in a waring blender. 100 ml of china clay was added to the suspension. The clay was dispersed for 60 seconds on low setting then immediately dispersed equally amount four 250 ml graduate cylinders. One cylinder became the blank while the remaining three test inhibitor treatment. The blank was returned to the blender and re-dispersed for 20 seconds on low. This suspension was returned to its graduated cylinder. A sample was withdrawn from a level of 100 ml and the turbidity was determined with a turbidimeter (Hach 2100A). This represented the initial reading for the blank, or untreated solution. The suspension was returned to the graduated cylinder and allowed to settle for 2 hours. Treatment cylinders are prepared by returning the remaining suspensions, in turn, to the blender, followed by the addition of 5 ppm inhibitor and redispersed for 20 seconds on low. Treatment cylinders are allowed to settle for 2 hours. At the end of 2 hours, samples are withdrawn from a level of 100 ml and turbidity readings were taken.

Percent clay dispersancy is determined using the following Equation 1 and the results are listed in Table 3.

$$\% \text{ clay dispers.} = \frac{\text{final treatment turb.} - \text{final blank turb.}}{\text{initial blank turb.} - \text{final blank turb.}} \times 100$$

Procedure for Kaolin Clay Slurry Dispersancy Tests

A suspension slurry of 61.3% kaolin in water containing a dispersant was mixed for 2 minutes with a steel caged paddle stirrer and the Brookfield viscosity of the suspension was measured at room temperature and pH of approximately 7. A preferred dispersant would have provided the dispersed kaolin slurry with a low viscosity. The test results are listed in Table 3.

This invention is applicable to industries where dispersion of kaolin slurry is desired. For example, the polymers in this invention can be added as a dispersant to beneficiated kaolin clays which are then shipped to papermaking industries. The dispersed kaolin clays have greatly increased pumping capacities.

The product MW determined with GPC and hydroxamic acid incorporation determined with $^{13}$C NMR are summarized in Table 4. The products numbered as 3909-38A, 3993-49A, 3993-53A and 3993-169 in Table 4 were similarly synthesized. The product molecular weights and compositions are summarized in Table 4 below.

A second procedure was carried out where less than one equivalent of hydroxylamine was charged to give the products numbered as 4049-68A, 4049-68B, 4049-68C, 3909-155, 3909-154 and 3993-1 in Table 4. A mechanically stirred suspension (in a 500 ml flask) of poly(succinimide of aspartic acid) (20.2 g, 0.206 mol) in dionized water water (50.0) was prepared. Under $N_2$, a solution of hydroxylamine prepared from hydroxylamine hydrochloride (8.50 g, 0.124 mol, 0.60 equivalent), dionized water water.(18.0 g), and 50% NaOH (10.3 g, 0.129 mol) was added dropwise the mechanically stirred solution. The suspension was further stirred under $N_2$ at room temperature for 21 hours. A NaOH solution prepared from NaOH (9.86 g, 0.123 mol, 0.60

TABLE 3

Stir & Settle and Clay Dispersion Test Results for HA/ASP Copolymers

| Inhibitor | copolymer composition mole %: N-hydroxyaspartamide/ aspartic acid | MW(K) | 40 ppm Inhibitor | | 10 ppm Inhibitor | | Cooling water clay dispersancy % | 61.3% Kaolin[a] Brookfield viscosity |
|---|---|---|---|---|---|---|---|---|
| | | | $CaCO_3$ ppt | inh % | $CaCO_3$ ppt | inh % | | |
| 3909-139C[b] | 46 | 1.9 | 182.8 | 63.4 | 322.1 | 35.9 | 48.5 | |
| 3993-20[b] | 20 | 5.9 | 196.7 | 60.7 | 329.0 | 36.2 | 40.0 | |
| 3993-38A[b] | 48 | 2.7 | — | — | — | — | 47.5 | |
| 3993-49A[b] | 72 | 1.7 | — | — | — | — | 42.9 | 215 cps |
| commercial kaolin dispersant[c] | — | — | — | — | — | — | — | 232 cps |

[a] A 61.3% kaolin slurry was used for the tests. The polymer dose was 15 lb. polymer/ton dry kaolin.
[b] Preparation conditions of these polymer samples are listed in Table 4.
[c] Polyacrylic acid.

Synthesis of Hydroxamic Acid-Containing Poly (Amino Acids)

In the following procedure, one or more equivalent of hydroxylamine was charged in the preparation of the polymers numbered 3909-139A, 3909-139C, 3993-38A, 3993-49A, 3993-53A and 3993-169 in Table 4 below. 50% NaOH (2.22 g, 0.0279 mol) was added to hydroxylamine hydrochloride (1.95 g, 0.0285 mol, 1.14 mole equivalent) was in dionized water (20 g) over 1–2 min. to give a clear solution of pH 7.84. This solution was added to a suspension of poly(succinimide of aspartic acid) (2.46 g, 0.025 mol) in dionized water (20.8 g). The resulting suspension was magnetically stirred at room temperature for 34 hours. The solids were found later from another experiment to disappear within 15 hours. After the pH was adjusted from 5.9 to 9.0, the solution was stirred for an additional 2.3 hours. The pH was finally adjusted from 8.7 to 7.7 to afford a crude product 3909-139A. The crude product was dialyzed against dionized water (membrane MWCO 1000) for 48 hours to remove unreacted hydroxylamine to give pure product 3909-139C.

equivalent) and deonized water water (16.1 g) was added dropwise at room temperature to the stirred suspension at pH 9.5. The resulting brown solution was further stirred for 1 hour and 20 min. The pH was adjusted with dilute HCl from 8.9 to 7.3. The solution was filtered in a vacuum to remove any undissolved particles to afford hydroxamic acid-poly (aspartic acid) 4049-68A (122.39 g). Part of 4049-68A was dialyzed to give pure HA-poly(asp) 4049-68B. Another part of 4049-68A was treated with $I_2$: $I_2$ (1.52 g, 0.00589 mol) was added to crude 4049-68A (45.4 g 0.0758 mol) at initial pH 7.3. The mixture was stirred at room temperature until the pH dropped to 4.2 and stabilized (3.0 hours). This afforded a red solution (still some $I_2$ left) 4049-68C. The products numbered 3909-155, 3993-154 and 3993-1 were synthesized using a procedure similar to 4049-68A. The product molecular weights and compositions are summarized in Table 4.

TABLE 4

Preparation Data for HA/ASP Copolymers

| Polymer | MW of poly(suc)[a] | Mole % of HA[b] charged | Initial pH | Rxn temp (°C.) | Rxn time (h) | Conversion (%) | Product purity | Product Composition: N-hydroxyaspartamide/ aspartic acid | Product MW (K) |
|---|---|---|---|---|---|---|---|---|---|
| 3909-139B | 94 | 1.12 | 7.8 | r.t. | 48 | 65 | crude | 65/35 | 2.2 |
| 3909-139C[c] | — | — | — | — | — | — | pure | 46/54 | 1.9 |
| 3909-155 | 3-4 | 20 | — | r.t. | 20 | — | crude | — | 2.6 |
| 3993-21[c] | — | — | — | — | — | — | pure | — | 4.5 |
| 3909-154 | 94 | 30 | 6.8 | r.t. | 26 | 77 | crude | 23/77 | 16 |
| 3993-20[c] | — | — | — | — | — | — | pure | 20/80 | 5.9 |
| 3993-1A | 3-4 | 15 | — | r.t. | 17 | — | crude | — | 2.9 |
| 3993-38A | 3-4 | 100 | 6.8 | r.t. | 69 | 48 | crude | 48/52 | 3.4 |
| 3993-40 | 3-4 | 100 | 7.1 | r.t. | 68 | 46 | crude | 46/54 | 3.5 |
| 3993-49A | 20 | 100 | 5.7 | 78 | 1 | 72 | crude | 72/28 | 3.9 |
| 3993-53A | 95 | 100 | 8.9 | r.t. 80 | 0.5 0.8 | 54 | crude | 54/46 | 6.0 |
| 3993-169 | 95 | 100 | 7.5 | r.t. | 66 | — | crude | — | 4.5 |
| 4049-68A | 95 | 60 | — | r.t. | 21 | 85 | crude | 51/49 | 14 |
| 4049-68B[c] | — | — | — | — | — | — | pure | — | 11 |
| 4049-68c | — | — | — | — | — | — | stabilized with I$_2$ | 42/58 | 14 |

[a]The actual MWs of poly(succinic acid) are not known. The MWs reported here are those of their hydrolyzed product poly(aspartic acid).
[b]The hydroxylamine was obtained by neutralizing hydroxylamine hydrochloride with one equivalent of NaOH solution.
[c]Obtained by dialyzing the up-line polymer.

Oxidation/Stabilization Procedures

The following methods were used to oxidize hydroxylamine residual and/or to stabilize the hydroxamic acid-containing poly(aspartic acid) numbered 3993-164A. A solution of hydroxylamine prepared from hydroxylamine hydrochloride (3.52 g, 0.050 mol, 1.0 equivalent), dionized water water (5.5 g) and 50% NaOH (3.97 g) was added to a stirred suspension of poly(succinimide) (5.0 g, 0.050 mol) in dionized water water (25.0 g). This gave a initial pH of 7.44. The suspension was stirred at room temperature for 14.5 hours After the pH was adjusted from 5.8 to 7.1, the solution was stirred for 25 hours. The pH was adjusted again to 9.0, and the solution was stirred for 4.5 hours. The pH was finally adjusted to 7.2. The solution was centrifuged to remove undissolved particles to give crude hydroxamic acid-containing poly(aspartic acid) 3993-164A (71 g) in Table 5.

For the product labelled 3993-164B in Table 5, 12.5 g of 3993-164A was acidified with dilute HCl to pH 3.5 in order to protonate hydroxylamine residual. For the product numbered 3993-164C in Table 5, 12.0 g of 3993-164A was acidified to pH 2.3 and then stirred with I2 (1.089) for 3 hours. The pH dropped to 1.63 (still some I$_2$ present). For the product numbered 3993-164D in Table 5, 10.4 g of 3993-164A was evaporated to dryness to give 1.52 g of solids. For the product numbered 3993-164E, 12.0 g of 3993-164A (pH 7.2) was stirred with I2 (1.08 g). The pH dropped from 7.2 to 2.9 within one min. and to 2.27 within 10 minutes.

The MWs of these polymer samples were determined with GPC two days after the treatments and determined again after they were stored in a refrigerator for 1.5 months. The results are summarized in Table 5.

TABLE 5

Methods to Stabilize HA/ASP Copolymers

| Entry | Polymer | Initial MW (PEG, K) | Treatment | MW on day n | | Polymer composition: N-hydroxyaspartamide/ aspartic acid | Comments |
|---|---|---|---|---|---|---|---|
| | | | | day n | MW | | |
| 1 | 3993-38A | 3.4 | no, pH 7.5 | 105 | 2.7 | — | the polymer was degraded |
| 2 | 3993-49A | 3.9 | no, pH 7.7 | 105 | 1.7 | — | the polymer was degraded |
| 3 | 3993-53A | 6.0 | no, pH 6.9 | 105 | 2.6 | — | the polymer was degraded |
| 4 | 3993-164A | 3.9 | no, pH 7.2 | 45 | 2.8 | 59/41 | the polymer was degraded |
| 5 | 3993-164B | 4.1 | yes, pH 3.5 | 45 | 3.9 | 64/36 | H$_2$NOH was protonated and the polymer was stabilized |
| 6 | 3993-164C | 4.1 | yes, pH 2.3 then I$_2$ | 45 | 3.6 | 60/40 | H$_2$NOH was oxidized and |

TABLE 5-continued

Methods to Stabilize HA/ASP Copolymers

| Entry | Polymer | Initial MW (PEG, K) | Treatment | MW on day n | | Polymer composition: N-hydroxyaspartamide/ aspartic acid | Comments |
|---|---|---|---|---|---|---|---|
| | | | | day n | MW | | |
| 7 | 3993-164D | 3.9 | yes, evaporated to dryness | 45 | 3.9 | 62/38 | the polymer was stabilized<br>the polymer was stabilized at solid state |
| 8 | 3993-164E | 4.0 | yes, pH 7.2 then $I_2$ | 45 | 3.9 | 65/35 | $H_2NOH$ was oxidized and the polymer was stabilized |
| 9 | 3993-20 | 5.9(PSS) | yes, dialysis | 180 | 6.3 | 23/77 | the pure polymer was stable |

Any other molecules reactive toward hydroxylamine or its salt can be used to react with residual hydroxylamine or its salt. When residual hydroxylamine or its salt is consumed by such a reaction, the product polymer is stable. For example, esters, preferably water-soluble esters such as glycol formate, glycol acetate, acyl chloride and amide can be used to react with residual hydroxylamine or its salt to form hydroxamic acids which are unreactive toward the polymer backbone.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed:

1. A method of reducing corrosion on metallic surfaces caused by a water, the method comprising:

adding a corrosion inhibiting composition to the solution, the composition comprising a poly(amino acid) polymer including hydroxamic acid-containing side chains and having the formula

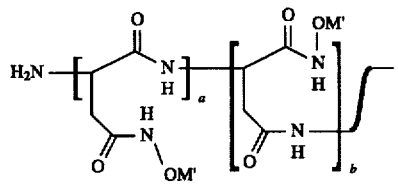

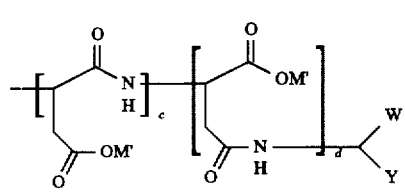

wherein W is selected from the group consisting of $CO_2M^2$ and CONHOH wherein $M^2$ is a metal ion; Y is selected from the group consisting of $CH_2CONHOH$ and $CH_2CO_2M^3$ wherein $M^3$ is a metal ion; $M^1$ is selected from the group consisting of an alkaline metal, an alkaline earth metal and ammonium; $(a+b)/(a+b+c+d)\times 100\%+(c+d)/(a+b+c+d)\times 100\%=100\%$; $(a+b)/(a+b+c+d)\times 100\%$ ranges from about 10% to about 50%; $(c+d)/(a+b+c+d)\times 100\%$ ranges from 50% to 90%; $a/(a+b)\times 100\%$ ranges from 0% to 100%; $b/(a+b)\times 100\%$ ranges from 0% to 100%; $c/(c+d)\times 100\%$ ranges from 0% to 100%; $d/(c+d)\times 100\%$ ranges from 0% to 100%; and $c/(c+d)\times 100\%+d/(c+d)\times 100\%=100\%$, the composition having a molecular weight ranging from 300 to 10,000.

2. A method of reducing corrosion on metallic surfaces caused by a water, the method comprising:

adding a corrosion inhibiting composition to the solution, the composition comprising a poly(amino acid) polymer including hydroxamic acid-containing side chains and having the formula

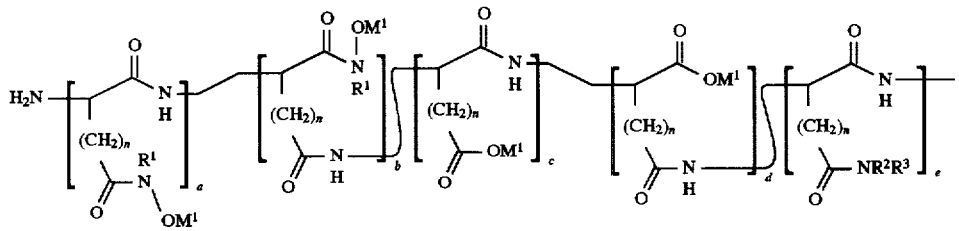

-continued

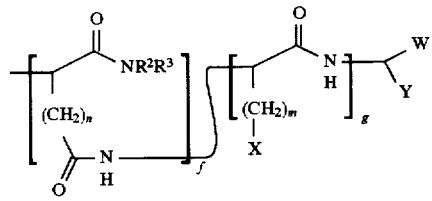

wherein n is selected from the group consisting of 1 and 2; m ranges from 0 to 4; $M^1$ is selected from the group consisting of an alkaline metal, an alkaline earth metal, and ammonium; X is selected from the group consisting of H, $CH_3$, $CH(CH_3)_2$, $CH(CH_3)CH_2CH_3$, OH, p-$HOC_6H_4$, SH, $CH_2SCH_3$, $CH_2OH$, $CH(OH)CH_3$, $NH_2$, $HNC(:NH)NH_2$, $C(O)NH_2$,

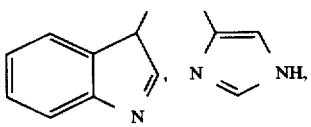

$OPO_3M_2^2$, $OSO_3M^2$, p-$M_2^2O_3POC_6H_4$, p-$M^2O_3SOC_6H_4$, $SPO_3M_2^2$, $CH_2OPO_3M_2^2$, $CH_2OSO_3$, $CH(OPO_3M_2^2)CH_3$ and $CH(OSO_3M^2)CH_3$, wherein $M^2$ is a metal ion; W is selected from the group consisting of $CO_2M^3$ and $C(O)NR^1OH$ wherein $M^3$ is a metal ion; Y is selected from the group consisting of $(CH_2)_kC(O)NROH$, $(CH_2)_kCO_2M^4$, $(CH_2)_kC(O)NR^2R^4$ and $(CH_2)_mX$ wherein $M^4$ is a metal ion, k ranges from 1 to 2; $R^1$ is selected from the group consisting of H, alkyl, alkenyl, aryl, carboxyl, sulfonyl, OH and halide substituted alkyl, alkenyl and aryl groups, and $OR^1$ wherein $R^1$ is selected from the group consisting of alkyl and aryl; $R^2$ and $R^3$ are selected from the group consisting of H, alkyl, alkenyl, aryl, carboxyl, sulfonyl, OH and halide substituted alkyl, alkenyl and aryl groups; (a+b)/(a+b+c+d)×100% ranges from about 10% to about 50%; (c+d)/(a+b+c+d)×100% ranges from 50% to 90%; (a+b)/(a+b+c+d)×100%+(c+d)/(a+b+c+d)×100%=100%; (e+f)/(a+b+c+d+e+f+g)×100% ranges from about 0% to about 30%; g/(a+b+c+d+e+f+g)×100% ranges from about 0% to about 30%; (a+b+c+d)/(a+b+c+d+e f+g)×100% ranges from about 50% to about 100%; (a+b+c+d)/(a+b+c+d+e+f+g)×100%+(e+f)/(a+b+c+d+e+f+g)×100%+g/(a+b+c+d+e+f+g)×100%=100%; a/(a+b)×100% ranges from 0% to 100%; b/(a+b)×100% ranges from 0% to 100%; a/(a+b)×100%+b/(a+b)×100%=100%; c/(c+d)×100% ranges from 0% to 100%; d/(c+d)×100% ranges from 0% to 100%; c/(c+d)×100%+d/(c+d)×100%=100%; and e/(e+f)×100%+f/(e+f)×100%=100%, the composition having a molecular weight ranging from 300 to 10,000.

3. A method of reducing scale build-up on metallic surfaces caused by a water, the method comprising:

adding a scale inhibiting composition to the solution, the composition comprising a poly(amino acid) polymer including hydroxamic acid-containing side chains and having the formula

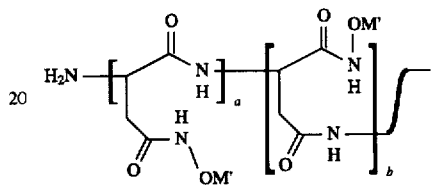

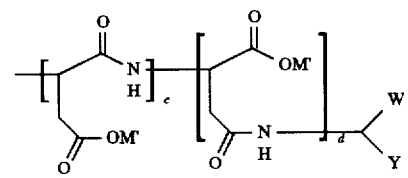

wherein W is selected from the group consisting of $CO_2M^2$ and CONHOH wherein $M^2$ is a metal ion; Y is selected from the group consisting of $CH_2CONHOH$ and $CH_2CO_2M^3$ wherein $M^3$ is a metal ion; $M^1$ is selected from the group consisting of an alkaline metal, an alkaline earth metal and ammonium; (a+b)/(a+b+c+d)×100%+(c+d)/(a+b+c+d)×100%=100%; (a+b)/(a+b+c+d)×100% ranges from about 10% to about 50%; (c+d)/(a+b+c+d)×100% ranges from 50% to 90%, d/(a+b)×100% ranges from 0% to 100%; b/(a+b)×100% ranges from 0% to 100%; c/(c+d)×100% ranges from 0% to 100%; d/(c+d)×100% ranges from 0% to 100%; and c/(c+d)×100%+d/(c+d)×100%=100%, the composition having a molecular weight ranging from 300 to 10,000.

4. A method of reducing scale build-up on metallic surfaces caused by a water, the method comprising:

adding a scale inhibiting composition to the solution, the composition comprising a poly(amino acid) polymer including hydroxamic acid-containing side chains and having the formula

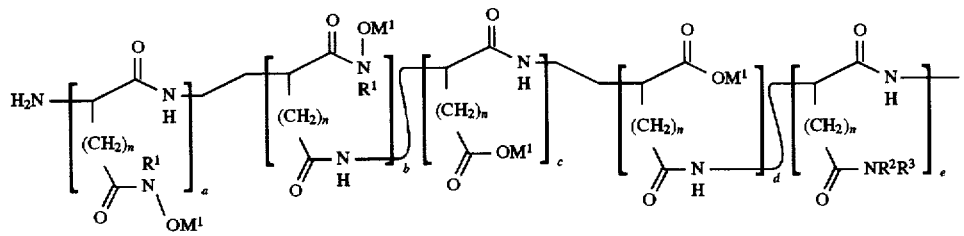

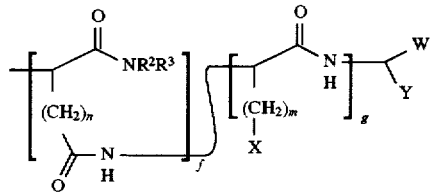

wherein n is selected from the group consisting of 1 and 2; m ranges from 0 to 4; $M^1$ is selected from the group consisting of an alkaline metal, an alkaline earth metal, and ammonium; X is selected from the group consisting of H, $CH_3$, $CH(CH_3)_2$, $CH(CH_3)CH_2CH_3$, OH, $p\text{-}HOC_6H_4$, SH, $CH_2SCH_3$, $CH_2OH$, $CH(OH)CH_3$, $NH_2$, $HNC(:NH)NH_2$, $C(O)NH_2$,

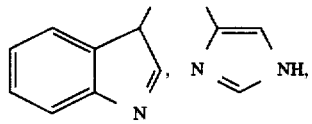

$OPO_3M_2^2$, $OSO_3M^2$, $p\text{-}M_2^2O_3POC_6H_4$, $p\text{-}M^2O_3SOC_6H_4$, $SPO_2M_2^2$, $CH_2OPO_3M_2^2$, $CH_2OSO_3M^2$, $CH)OPO_3M_2^2)CH_3$, and $CH(OSO_3M^2)CH_3$, wherein $M^2$ is a metal ion; W is selected from the group consisting of $CO_2M^3$ and $C(O)NR^1OH$ wherein $M^3$ is a metal ion; Y is selected from the group consisting of $(CH_2)_kC(O)NR^1OH$, $(CH_2)_kCO_2M^4$, $(CH_2)_kC(O)NR^2R^4$ and $(CH_2)_mX$ wherein $M^4$ is a metal ion, k ranges from 1 to 2; $R^1$ is selected from the group consisting of H, alkyl, alkenyl, aryl, carboxyl, sulfonyl, OH and halide substituted alkyl, alkenyl and aryl groups, and $OR^1$ wherein $R^1$ is selected from the group consisting of alkyl and aryl; $R^2$ and $R^3$ are selected from the group consisting of H, alkyl, alkenyl, aryl, carboxyl, sulfonyl, OH and halide substituted alkyl, alkenyl and aryl groups; $(a+b)/(a+b+c+d)\times100\%$ ranges from about 10% to about 50%; $(c+d)/(a+b+c+d)\times100\%$ ranges from 50% to 90%; $(a+b)/(a+b+c+d)\times100\%+(c+d)/(a+b+c+d)\times100\%=100\%$; $(e+f)/(a+b+c+d+e+f+g)\times100\%$ ranges from about 0% to about 30%; $g/(a+b+c+d+e+f+g)\times100\%$ ranges from about 0% to about 30%; $(a+b+c+d)/(a+b+c+d+e+f+g)\times100\%$ ranges from about 50% to about 100%; $(a+b+c+d)/(a+b+c+d+e+f+g)\times100\%+(e+f)/(a+b+c+d+e+f+g)\times100\%+g/(a+b+c+d+e+f+9)\times100\%=100\%$; $a/(a+b)\times100\%$ ranges from 0% to 100%; $b/(a+b)\times100\%$ ranges from 0% to 100%; $a/(a+b)\times100\%+b/(a+b)\times100\%=100\%$; $c/(c+d)\times100\%$ ranges from 0% to 100%; $d/(c+d)\times100\%$ ranges from 0% to 100%; $c/(c+d)\times100\%+d/(c+d)\times100\%=100\%$; and $e/(e+f)\times100\%+f/(e+f)\times100\%=100\%$, the composition having a molecular weight ranging from 300 to 10,000.

* * * * *